I. R. RENNER.
TIRE FORMING TUBE.
APPLICATION FILED JUNE 11, 1917.

1,286,107.

Patented Nov. 26, 1918.

INVENTOR.
I. R. Renner
BY Robert M. Pierson
ATTORNEY

UNITED STATES PATENT OFFICE.

IRVIN R. RENNER, OF AKRON, OHIO, ASSIGNOR TO THE B. F. GOODRICH COMPANY, OF NEW YORK, N. Y., A CORPORATION OF NEW YORK.

TIRE-FORMING TUBE.

1,286,107.   Specification of Letters Patent.   Patented Nov. 26, 1918.

Original application filed June 17, 1916, Serial No. 104,289. Divided and this application filed June 11, 1917. Serial No. 174,098.

*To all whom it may concern:*

Be it known that I, IRVIN R. RENNER, a citizen of the United States, residing at Akron, in the county of Summit and State of Ohio, have invented certain new and useful Improvements in Tire-Forming Tubes, of which the following is a specification.

This invention relates to inflatable tubes used in the manufacture of pneumatic-tire casings, and especially cord-tire casings. Its object is to provide a tube, which, when inflated with compressed air or other fluid, will expand circumferentially as a whole without substantially increasing its cross-sectional size, and may therefore be employed either as the sole means or in conjunction with other devices for imparting substantially the ultimate shape of a tire carcass which is initially in an annular, transversely-flat or cylindrical form.

This application is a division of my application Serial No. 104,289 filed June 17, 1916, patented March 12, 1918, No. 1,259,289.

Of the accompanying drawings.

Figure 1:
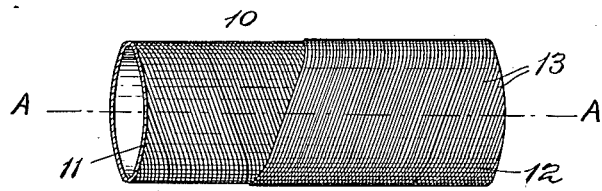
Figure 1 is a plan view showing a fragment of a tube constructed according to my invention.

The tube 10 is made of a suitable number, preferably two, layers 11, 12 of rubber reinforced with threads 13 of twisted cotton or other suitable fiber, the material being preferably applied in the form of bands wound diagonally at opposite angles in the respective layers and then vulcanized into an integral structure, after the well-known mode of making Palmer bicycle tires, each band consisting of a calendered strip of rubber in which are embedded the parallel twisted threads. Instead of following the practice in that art of laying the threads at an angle to the middle line A—A of about 45°, which results in a tube whose inner circumference contracts when inflated, I make the angle more than 55°. At about the latter angle the tube would be neither expansible nor contractible circumferentially when inflated, and I therefore lay the threads at an angle, preferably, between 65° and 85°, in order to furnish a tube which will elongate on both its inner and outer peripheries, or, in other words, will stretch circumferentially as a whole when sufficiently inflated. Fig. 1 shows an angle of substantially 70°, which I have used successfully in tubes for making tires of 4″ section.

Figure 2:
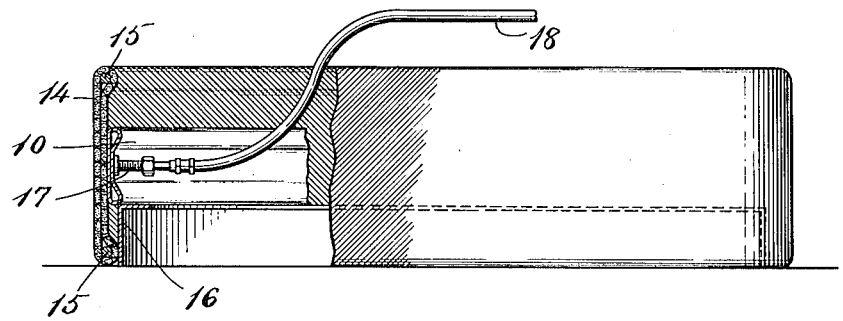
Fig. 2 is a side elevation, partly in section, showing the deflated tube assembled, together with a gage, within the tire-forming annulus preparatory to shaping the latter.
Figure 3:
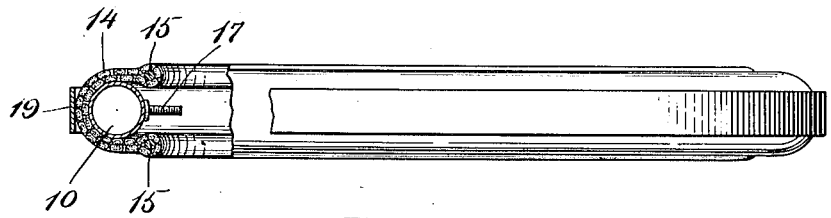
Fig. 3 is a side elevation, partly in section, showing the tube in its expanded condition and the tire carcass shaped and stretched thereby to a circumference determined by an outer gage.

Figs. 2 and 3 illustrate the preferred manner of using the tube in shaping a cord-tire carcass 14, which is made initially in the form of a transversely-flat annulus as indicated in Fig. 2, and is supported horizontally upon a table while being shaped. This view represents a two-ply carcass with inextensible bead rings 15 in its edges. 16 is an annular positioning-gage, L-shaped in section, resting upon the table within the tire-forming annulus, and forming a shelf of the proper height for supporting the deflated tube 10 in the middle of said annulus. Tube 10 is provided with an ordinary tire valve 17 to which is connected the air-supply hose 18.

When the tube 10 is inflated, it becomes approximately circular in cross-section and also expands or stretches circumferentially on both its inner and outer peripheries without increasing its cross-sectional dimensions. Thereby the cord annulus is caused to assume substantially its ultimate U-shape by the distention of its middle portion and the drawing-together of the beads, the tube expanding until its inner periphery lies substantially at or outside of the circle of the beads. So far as I am aware, my present invention is the first instance of a tire-shaping tube capable of performing this function.

A cylindrical metal hoop 19, having an inner circumference equal to the desired outer circumference of the tire carcass, is slipped over the latter while it is being distended by inflation of the tube 10, so as to act as a gage; and when the carcass has reached this circumference, the hoop 19 is removed and the carcass is ready for the application of its rubber tread and side strips, breaker strip, fabric bead covers, rubber bead corner strips, and other elements pertaining to the finishing of the raw tire. This finishing may be performed while the carcass remains distended by the air tube 10, which latter permits free access to all sides of the beads in performing the finishing operations thereon. When the raw tire is completed, the tube 10 is preferably deflated and removed and another tube, of the usual construction employed in vulcanizing cord tires, is inserted for the purpose of holding the tire distended while it is vulcanized in a suitable mold.

I claim:

1. An annular tire-shaping tube composed of rubber and a series of reinforcing elements substantially inextensible transversely and collectively extensible longitudinally of the tube to permit the circumferential expansion of the latter as a whole and substantially prevent its transverse expansion.

2. An annular tube for shaping tire carcasses, said tube being reinforced with layers of threads wound diagonally thereon in opposite directions at an angle to the middle circumferential line greater than 55°.

3. An annular tube for shaping tire carcasses, said tube being reinforced with layers of threads wound thereon in opposite directions at an angle to the middle circumferential line of between 65° and 85°.

4. An annular tube for shaping tire carcasses, said tube being reinforced with layers of threads wound thereon in opposite directions at an angle to the middle circumferential line of substantially 70°.

5. An annular tube for shaping tire carcasses, said tube composed of rubber layers in which are embedded parallel fibrous threads wound diagonally in opposite directions in the respective layers at an angle to the middle circumferential line greater than 55° and less than a right angle, said tube having an inflating valve.

In testimony whereof I have hereunto set my hand this 9th day of June 1917.

IRVIN R. RENNER.